United States Patent [19]
Chau et al.

[11] Patent Number: 6,101,773
[45] Date of Patent: Aug. 15, 2000

[54] WIRE MANAGEMENT SYSTEM

[75] Inventors: Theodore Q. Chau, Kentwood; Keith A. Haagsma, Spring Lake; R. Scott Hand, Kentwood; Kevin M. Stanley, Caledonia, all of Mich.

[73] Assignee: Steelcase Inc., Mich.

[21] Appl. No.: 09/229,526

[22] Filed: Jan. 13, 1999

[51] Int. Cl.⁷ .................................. E04C 2/52; H02G 3/00
[52] U.S. Cl. .................... 52/220.7; 52/220.1; 52/220.2; 52/220.3; 52/239; 174/48; 439/215; 248/68.1; 248/74.2; 312/223.6
[58] Field of Search ................................ 52/220.7, 220.1, 52/220.2, 220.3, 239; 174/48; 439/215; 248/68.1, 74.2; 312/223.6; 108/50.02

[56] References Cited

U.S. PATENT DOCUMENTS

| | | |
|---|---|---|
| 1,715,538 | 6/1929 | Dean et al. . |
| 2,756,369 | 7/1956 | Gorrie . |
| 3,462,892 | 8/1969 | Meyer . |
| 3,932,696 | 1/1976 | Fork et al. ................................. 174/48 |
| 4,185,422 | 1/1980 | Radek ........................................ 52/36.6 |
| 4,371,757 | 2/1983 | Debortoli et al. . |
| 4,559,410 | 12/1985 | Hostetter . |
| 4,631,881 | 12/1986 | Charman . |
| 4,642,418 | 2/1987 | Menchetti . |
| 4,971,281 | 11/1990 | Steinbeck . |
| 5,014,164 | 5/1991 | Casa et al. . |
| 5,039,827 | 8/1991 | Harmon .................................... 174/48 |
| 5,112,240 | 5/1992 | Nienhuis et al. . |
| 5,116,007 | 5/1992 | Von Gunton et al. . |
| 5,188,326 | 2/1993 | Zich . |
| 5,219,406 | 6/1993 | Raz . |
| 5,224,673 | 7/1993 | Webb ..................................... 248/27.1 |
| 5,277,006 | 1/1994 | Ruster . |
| 5,362,923 | 11/1994 | Newhouse et al. . |
| 5,370,553 | 12/1994 | Zimmerman . |
| 5,460,345 | 10/1995 | Trevaskis . |
| 5,535,102 | 7/1996 | Neill et al. . |
| 5,574,251 | 11/1996 | Sevier ......................................... 174/50 |
| 5,715,633 | 2/1998 | Raz et al. . |
| 5,731,958 | 3/1998 | Kozel . |
| 5,740,650 | 4/1998 | Seiber et al. .............................. 52/584.1 |
| 5,778,612 | 7/1998 | Kissinger et al. . |
| 5,831,211 | 11/1998 | Gartung et al. . |
| 5,839,240 | 11/1998 | Elsholz et al. ............................. 52/242 |
| 5,867,955 | 2/1999 | Russell ....................................... 52/239 |
| 5,913,787 | 6/1999 | Edwards .................................. 52/220.7 |
| 5,927,030 | 7/1999 | Petit et al. ............................... 52/220.1 |

OTHER PUBLICATIONS http://www.siemon.com/cgi–bin/SiemonCatalog.exe, visited Jun. 30, 1999, e–catalog, cable management accessories, showing "Panel Access Hinge," Part #PH–3.
Panduit Corp, 1995 Wiring and Communication Products Catalog, showing "Panduct Wiring Duct," on pp. 44 and 45.

*Primary Examiner*—Carl D. Friedman
*Assistant Examiner*—Jennifer I. Thissell
*Attorney, Agent, or Firm*—Foley & Lardner

[57] ABSTRACT

A wire management system for use with furniture panels and being especially useful for the management of voice and data wiring includes a support plate and a plurality of vertically arranged rows of slots for receiving mounting blocks for patch panel brackets and the like. The slots may be provided in the plate itself or in a series of channel members attached to the plate. The blocks can be rotated 90 degrees to facilitate the connection of wiring to wiring connection devices when the blocks are in a first position and to a second position in which the wires and associated equipment occupy a minimum amount of space. The cover for the wire management system is preferably hinged at the top or side. A lock may be provided therefore for security, and a prop rod may be provided to hold the cover in an open position. In a most preferred embodiment, the plate may be adjusted using telescoping components to accommodate different size openings in the furniture module. In another aspect of the invention, strain relief brackets are provided and are coupled to the slots below the mounting blocks.

34 Claims, 7 Drawing Sheets

WIRE MANAGEMENT SYSTEM

CROSS REFERENCE TO RELATED APPLICATIONS, IF ANY

None.

BACKGROUND OF THE INVENTION

1. Field of the Invention

The present invention relates generally to the art of wire management and, more particularly, to the management of various types of wiring used in modular furniture systems. Still more specifically, the present invention relates to a wire management system which may be located within a panel of a modular system and which facilitates work by wiring installers and repair persons and minimizes the space required to accommodate the wire management system. In its most preferred embodiment, the present invention also relates to the field of in-panel wire management systems which may be readily adapted to a wide variety of panel opening sizes, cover configurations and the like.

2. Description of the Prior Art

Modular furniture systems of the type which include individual panel units for separating a work space into a plurality of workstations are well known. It is also well known that power, voice and data communication cables can be used in such systems and may be passed from panel to panel to facilitate the furnishing of electricity, communications and data capabilities to the individual work sites. A number of prior art systems provide for the running of cable from a central location, such as a communication closet, to the individual work stations, such systems being known as "home-run" systems. It is also known that wiring may be run between a central communications or power distribution center and a consolidation point located within the modular panel system. From such consolidation point, further wiring can be directed to the work spaces. In these latter types of systems, reconfiguration of the work spaces or movements of personnel within existing configurations can be expedited simply by manipulations of the cabling at the consolidation point, without moving the wiring upstream of that point.

In U.S. Pat. No. 4,559,410 issued Dec. 17, 1985, to Hostetter and entitled "Access Panel", the inventor describes a support plate mounted on an interior wall of a furniture panel, and a pivotable cover is shown for the wiring compartment. An electrical junction box and a plurality of communication boxes are adhesively attached to the plate and a series of connector clips are used for coupling data cable terminal ends to one another. The compartment itself is located above a raceway and receives cabling through its lower end. The power and other cabling leaving the consolidation panel also passes into the raceway mounted beneath the support plate.

Another patent describing a wire management compartment in a furniture panel system is Van De Riet U.S. Pat. No. 5,172,529, issued Dec. 22, 1992, and entitled "Hinged Wire Management Cover Panel." In this system, a cover (support member) is pivotally mounted at its upper edge to cover the wiring area, the support member including a bracket and a pedestal which engages a front edge of the panel system to hold the support member in an open position to facilitate work by cable installers.

Another electrical utility module which can be mounted within a rectangular framework is described in Menchetti U.S. Pat. No. 4,642,418, issued Feb. 10, 1987, and entitled "Utility Module for Walls and the Like." In this system, an open rectangular frame is mounted in a wall, and flanges are provided which include adjustable plates. Side plates abut with adjacent panels and the upper and lower plates overlap, the plates being secured to wall studs to provide a firm mounting for the module. A removable cover permits access, provides sound insulation and a resilient seal. The system is used primarily for electrical components for workstations, but voice and data capabilities are also disclosed.

A strain relief device for use in cable management systems is disclosed in U.S. Pat. No. 5,277,006, issued Jan. 11, 1994, to Ruster and entitled "Cable Management Apparatus." Individual cables are supported in a bracket which is attached to slots in the side frame elements of a wall panel system. The brackets further support wire retainers, which in the preferred embodiment include two semi-circular clips, extending in opposite directions from a flat plate to hold the cables in a vertically spaced relationship to one another.

A further door support, particularly for electrical meters and the like, is disclosed in U.S. Pat. No. 1,715,538, issued on Jun. 4, 1929, to Dean et al. and entitled "Meter Housing." In this device, a support cover includes a pair of support rods pivotally extending from the cover and having their terminal ends resting on the bottom of the meter housing to hold the door in an open position.

A wide variety of cabinet and shelving systems are also known which employ a series of vertical slots for supporting a wide variety of shelving, bookcases, cabinets and the like. Common examples are the vertical standards with slots and the book shelf brackets which are sold in nearly all hardware stores. A pair of such standards are mounted vertically and parallel to one another, and brackets are attached to the standards using hooks, typically provided in pairs. Such systems are commonly used for the display or organization of various articles and are replacements for peg board systems, and the like. One such bracket and vertical support system is illustrated in Trevaskis U.S. Pat. No. 5,460,345, issued Oct. 24, 1995, and entitled "Adjustable Merchandise Display System." In the preferred embodiment of this device, a shelf system includes bracket plates which have four different pairs of hooks on their edges and a central aperture for receiving a generally square bar. Each hook pair is adapted to engage different slot configurations, and the central opening preferably includes a number of angled recesses so that the bar may be placed in a variety of rotational orientations to permit a shelf to be suspended horizontally or to be inclined from the horizontal.

Although a number of these prior art systems and components provide satisfactory results, several commonly encountered installation and utilization problems still exist. For example, the depth of modular furniture panels is typically in the range of 2–4 inches, and the space within such panels is thereby limited for the containment of wires and wire connection devices, such as patch panels. The limited space makes it difficult for the installer, or for someone attempting to make a change or repair to the wiring, to manipulate the wires and have good physical and visual access. In addition, a large number of panel systems are in use, many of which have different size interior openings, raceway locations and the like, which makes the adaptation of a single type of wire management system difficult. Furthermore, enhancements can still be made to problems commonly encountered by installers or repair persons, such as minimizing strain on the wiring as it is being installed, changed or repaired and holding open the access door for the compartment to facilitate installation, repair or modification. A wire management system which provides for ready access, which enhances accessibility to internal components, which relieves strain on the wiring, which can be easily and safely held open, and which is readily adaptable to a wide variety of modular furniture products would represent a significant advance in this art.

FEATURES AND SUMMARY OF THE INVENTION

A primary feature of the present invention is to provide an in-panel wire management system which overcomes the above-noted disadvantages of prior art systems, including ease of access and adaptability to a wide variety of panel systems.

Another feature of the present invention is to provide a system which provides two positions for the wire connection devices within the compartment, the first of which positions is used during installation, repair of alteration and the second of which is used when the compartment is closed and space requirements are minimized.

A further feature of the present invention is to provide a wire management system with security enhancements to prevent intentional or inadvertent alterations of wiring within a wiring compartment.

A different feature of the present invention is to provide a wire management system which may be readily adapted for installation in a wide variety of modular furniture panels, and which may include a removable cover or a cover hinged at the top, bottom or either side and in which the cover may be quickly and safely held in an open position to permit access by a cable installer or an individual responsible for repair or alteration of the cabling.

A still further feature of the present invention is to provide a wire management system which includes strain relief brackets which may be installed easily and which cooperate with movable mounting blocks.

How the foregoing features are accomplished in the present invention will become apparent after reading the following detailed description of the preferred and alternative embodiments, taken in conjunction with the FIGURES. Generally, however, they are accomplished by providing a support plate which includes a plurality of rows of slots, the rows being arranged vertically and spaced apart from one another across the plate. The slots may be provided in the support plate itself or, preferably, are provided in channels attached to the plate. The channels are themselves spaced horizontally from one another and extend in a vertical direction. Modular mounting blocks having two pairs of hooks on adjacent edges are rotatable between at least a first and a second position. Brackets for supporting wire connection devices, such as patch panels, are attached to the mounting blocks. In the first position, the brackets and the patch panels are arranged for easy installation, repair or alteration of the cabling. When the blocks are rotated so that the other pair of hooks are engaged in the slots, the brackets, wiring connectors and the wires are rotated 90 degrees so that they occupy less depth within the compartment and are placed into a use orientation. A cover for the wiring compartment, in the illustrated embodiments, is pivotally hinged along the top or a side, and a prop rod may be included for any top hinged embodiment, to hold the cover in an open position when required. In a disclosed and illustrated preferred embodiment, strain relief brackets may also be included, which brackets include hooks insertable into the same rows of slots used for the mounting blocks. They are typically located below the mounting blocks. In further aspects of the preferred and alternative embodiments, the support plate may be constructed from a single piece sized for the particular opening with which it will be used or from multiple, telescoping components to allow a single product to be used in furniture panels having a variety of different size openings. Other ways in which the features of the present invention are accomplished will become apparent to those skilled in the art after they read and understand the present invention. Such other ways are deemed to fall within the scope of the present invention, if they fall within the scope of the claims which follow.

DESCRIPTION OF THE FIGURES

In the following drawings, like reference numerals are used to indicate like components and.

DETAILED DESCRIPTION OF THE PREFERRED AND ALTERNATIVE EMBODIMENTS

Before proceeding to the detailed description of the preferred and alternative embodiments, several general comments can be made about the applicability and the scope of the present invention. First, while brackets for holding patch panels are illustrated in certain of the drawings and are coupled to the mounting blocks shown in detail in FIG. 4, a variety of other components used in wiring systems can be mounted to the blocks without departing from the teachings of the present invention. For example, circuit breakers, junction boxes, tap-off modules and the like could be easily substituted for the illustrated wiring connection device.

Second, piano hinges are shown for mounting covers in the FIGURES, but other types of hinges could be substituted therefore. For example, pin and cylinder hinges, or cabinet type hinges could be used. The number of hinges is also not critical to the invention, and hinges ranging in number from 1 to 4 or more may be employed. Furthermore, the door could be a snap-in door or a door which hangs on frame elements instead of using any hinges, and if a hinge is not used, the prop rod described and illustrated would also be omitted.

Figure 1:
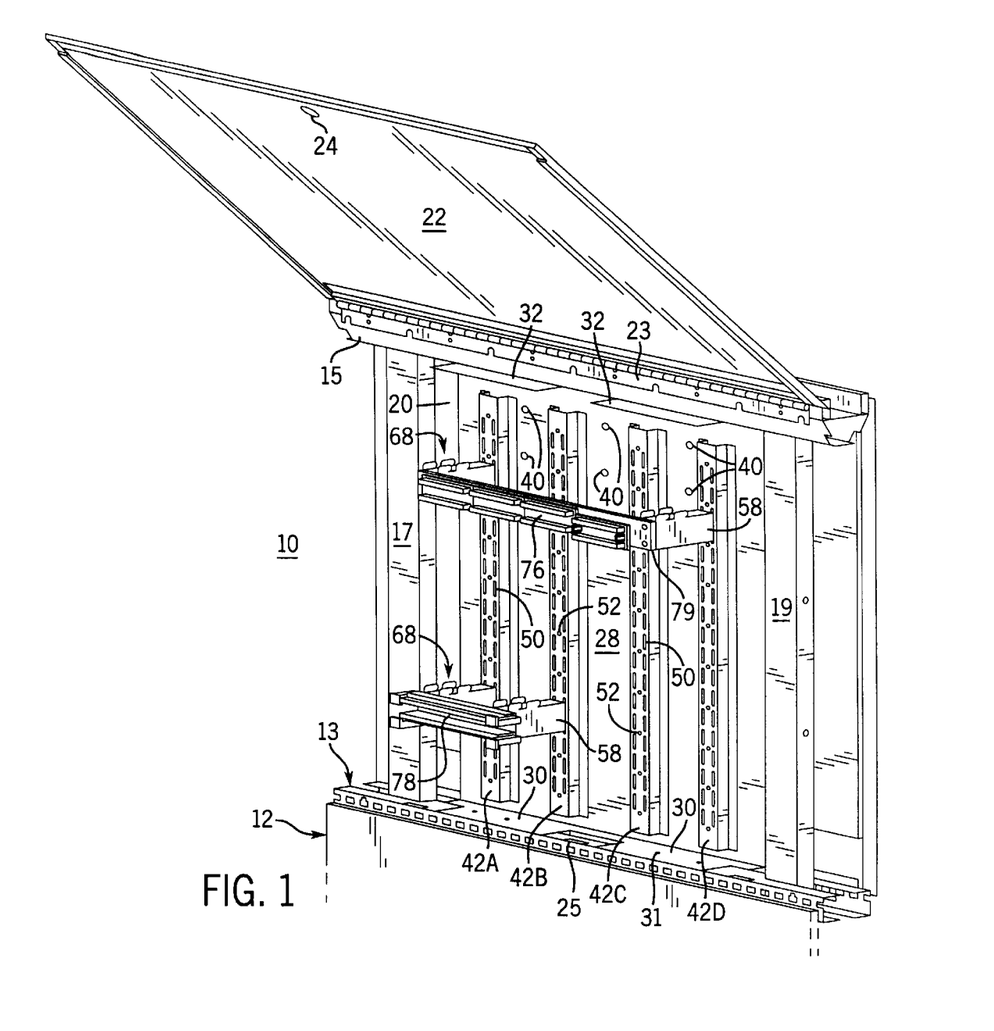
FIG. 1 is a perspective view of a first embodiment of the present invention and illustrating a telescoping support plate, top hinged wire management system, with the mounting blocks thereof shown in an installation orientation.
Figure 2:
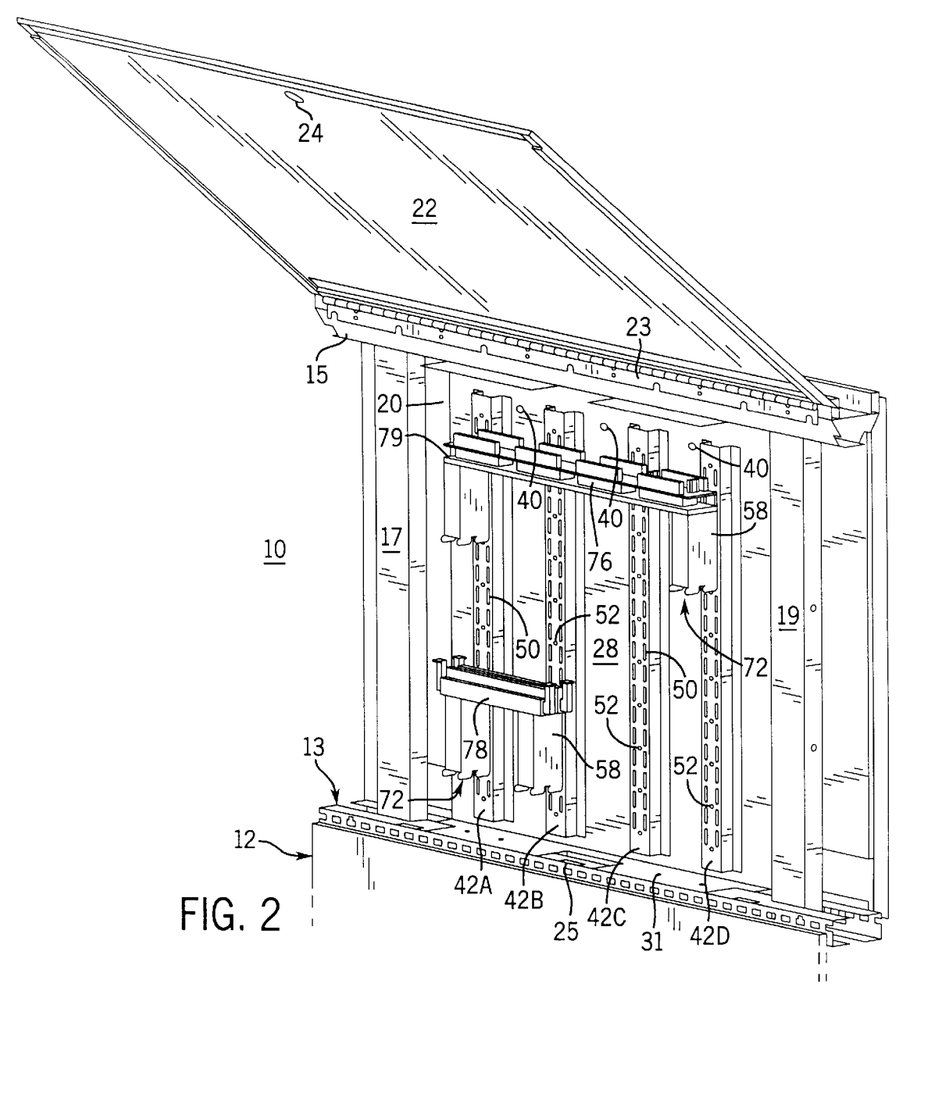
FIG. 2 is a perspective view of the wire management system shown in FIG. 1, with the mounting blocks in the use or storage position.
Figure 3:
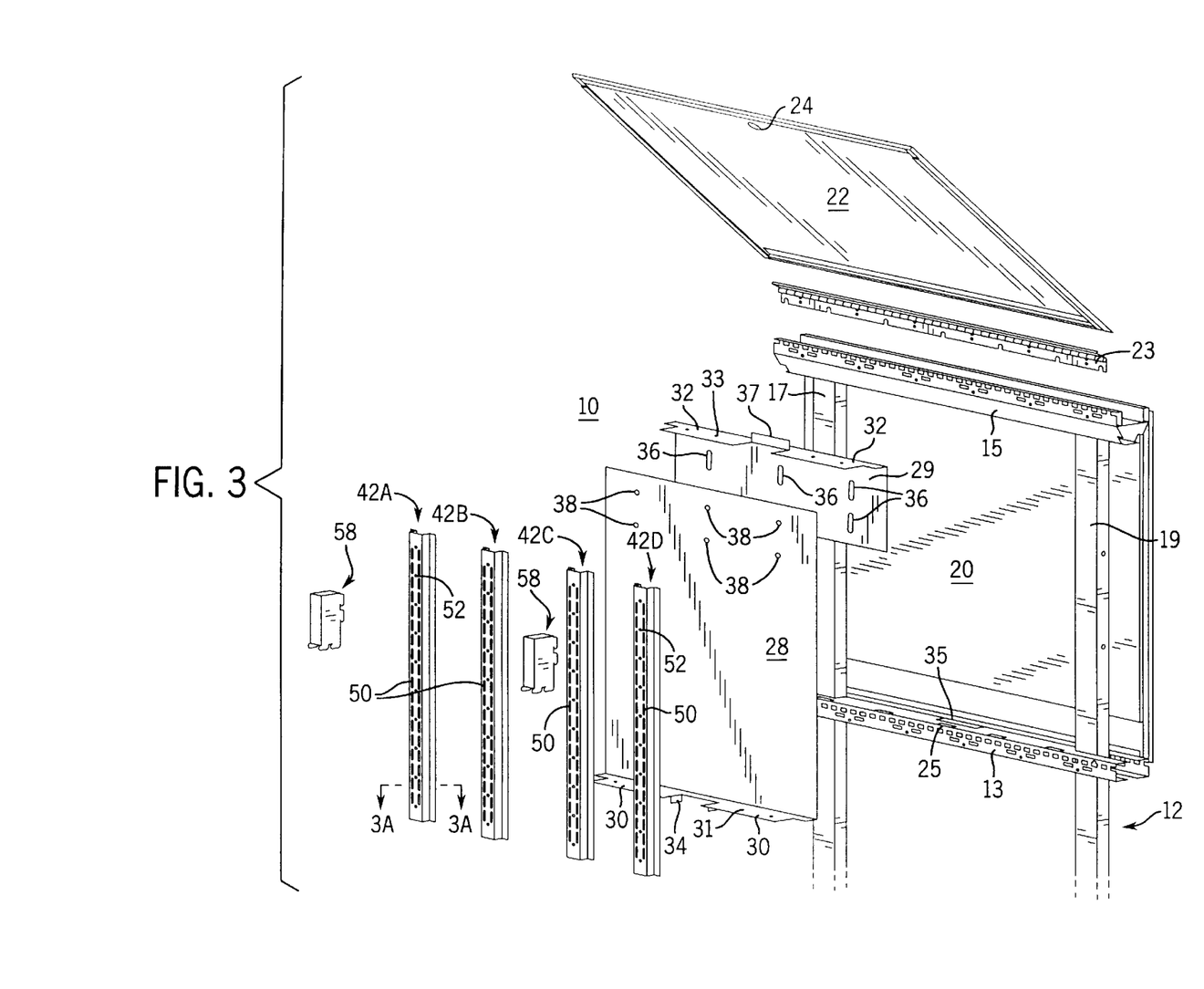
FIG. 3 is an exploded view of the wire management system shown in FIG. 2.

Third, in FIGS. 1–3, a telescoping support plate is described to allow the in-panel wire management system of the present invention to be used with panel openings of a variety of heights and to provide complete top-to-bottom coverage for the panel opening. Other telescoping plate components, such as components extending from the sides of the support plate could also be used to provide even more complete opening coverage. Further, in connection with techniques for joining telescoping panel components, sheet metal screws are illustrated, but a wide variety of fasteners could be used. For example, nuts and bolts, rivets and other fasteners could be employed. Further, it should be noted that the wire management capabilities illustrated in FIGS. 1–3 could be accomplished with a single, sized-to-application support plate, i.e. without using telescoping plate components at all.

Fourth, the particular hook and slot arrangement illustrated is a common one, and the slots are arranged on one inch centers. Other hook and slot configurations, such as those discussed in the aforementioned Trevaskis patent, could be used.

Fifth, the channels which are illustrated in various FIGURES and which contain double rows of slots, could be shaped differently, as long as they are deep enough to allow the hooks to enter the slots and slide downwardly to secure the mounting blocks in position. In addition, the channels could be attached using mechanical fasteners, such as screws or bolts, or they could be welded in place, as is the case in the preferred embodiment. The number of such channels could also be widely varied depending upon the particular size of the panel opening and the number of wires to be consolidated within the compartment. Furthermore, for some applications, it may be perfectly acceptable to provide the slots in the support plate itself, rather than using channels. In such applications, for example, there may be no concern about security from the reverse side of the plate. An advantage of using the channels is that the hooks of the blocks cannot be tampered with from the reverse side, since they are protected by the sheet metal expanse. An example of a situation in which the channels could be eliminated is where the panels adjoin a fixed wall. Another advantage of the channels is that the edges of the hooks, which may be sharp, cannot damage any equipment or furniture components located near the rear side of the support plate.

Sixth, locks will typically be provided for the covers which are illustrated in FIGS. 1–3 and 5–7. The particular locks can be widely varied, one preferred form being shown in FIG. 7. The locks can be operated by key, combination, etc.

Seventh, the embodiment shown in FIGS. 1–3 includes a self-centering feature which may or may not be used depending upon the particular panel with which the in-panel wire management system of the present invention is used. The illustrated centering technique can be easily varied by those skilled in the art after they read the present specification, and after they examine the configuration of the panel components which will surround the opening, be they horizontal or vertical.

Eighth, the illustrations show several panel configurations manufactured by the assignee of the present invention, and in each of them various openings are provided for admitting wires to the compartment formed by the wire management system of the present invention and for permitting wires to be directed to workstations or to further consolidation points located downstream of the illustrated panel. The particular orientation, number and shape of such openings can be variously embodied.

Figure 7:
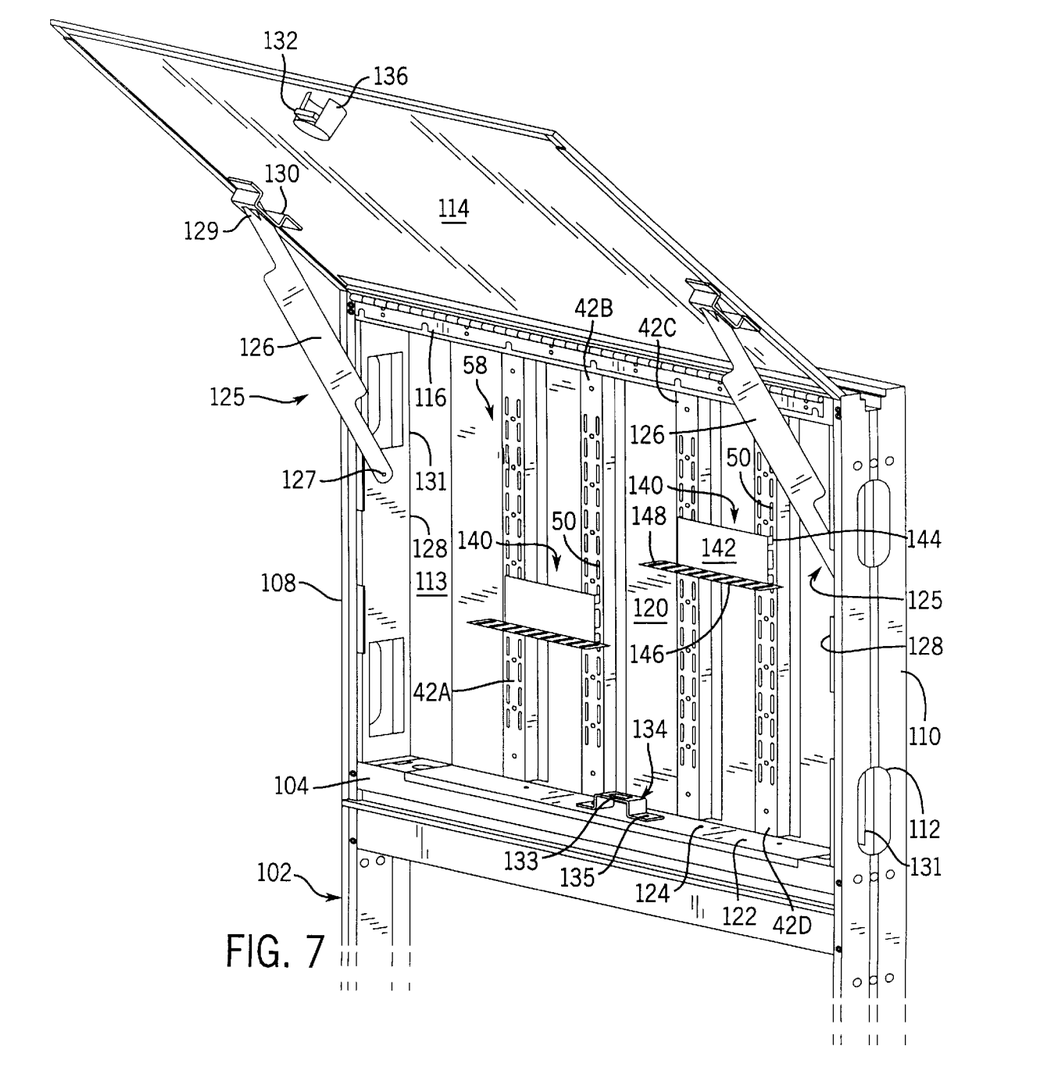
FIG. 7 is a perspective view of a portion of the wire management system shown in FIG. 6, but illustrating a prop rod used therewith and further illustrating strain relief brackets, the mounting blocks not being shown for purposes of drawing simplification.

Ninth, the strain brackets which are preferred for use in the present invention are illustrated in FIG. 7. Strain brackets need not be employed at all, or other and previously known strain relief techniques can be employed. Such techniques include the use of simple plastic straps, web strips and the like to keep the weight of a wire bundle from pulling wire terminations from their intended locations in a patch panel or other wire connection device. The modularity of the brackets described herein provides an efficient match with the mounting blocks.

Tenth, while rectangular mounting blocks are shown in the drawings, they could be square or any other shape, as long as they could be coupled to the support plate in at least two orientations.

Eleventh, while hooks and slots are the preferred method of attaching the mounting blocks to the support plates in a removable manner, other structures could be employed, such as applying Velcro® fastening hooks on two sides of the mounting blocks and Velcro® loop strips on the support plate.

Twelfth, the mounting blocks could be used to adjustably secure any other cabling elements onto the panels, such as punch down blocks, patch panels, fiber panels, or electronic equipment and the like.

Proceeding now to the description of the preferred embodiment of the present invention, FIGS. 1–3 illustrate a wire management system 10 for use with a furniture panel 12. Wire management system 10 is located in an area defined by a lower horizontal frame element 13, an upper horizontal frame element 15 and a pair of spaced apart vertical frame elements 17 and 19. In the illustrated panel 12, frame elements 17 and 19 are located inwardly of the respective outer ends of horizontal elements 13 and 15. The various frame elements define an opening 20, best seen in FIG. 3.

The cover for wire management system 10 includes a door 22 mounted by a piano hinge 23 to upper horizontal element 15. An aperture 24 is shown in these FIGURES for a lock, the details of which are not provided for the reasons indicated above. A slot 25 is provided at the center of lower horizontal frame element 13 to receive a component of the lock during closure. The inner surface of door 22 is generally flat, while the outer surface may have whatever decorative finish compliments the exterior of panel 12.

Simultaneous reference to FIGS. 1 and 3 will be useful in understanding the support plate components which define the rear wall of wire management system 10. These include a first larger plate 28 having a pair of flanges 30 extending outwardly from the lower edge thereof and adapted to rest on the upper surface of lower horizontal frame element 13. Each of the flanges 30 are provided with openings 31 for fasteners, such as metal screws, rivets, bolts or the like used to securely attach plate 28 to the lower horizontal frame element 13. Complimenting the larger plate 28 is a smaller upper plate 29 (see FIG. 3) which is of the same width as plate 28 and which includes a pair of outwardly extending flanges 32 adapted to engage a lower surface of upper horizontal frame element 15. As seen in FIG. 3, these flanges 32 also include openings 33 for fasteners.

Plate 28 also includes self-centering structure as illustrated best in FIG. 3. Tabs 34 extend downwardly from the inner edges of each of flanges 30 and are adapted and arranged for being located at the center ends of a slot 35 provided in the upper surface of lower horizontal frame element 13. Placing the tabs 34 within the slot 35 will ensure that lower plate 28 is properly centered between the vertical frame elements 17 and 19. Top or side centering elements could be added as desired, such as an upwardly extending tab 37 on plate 29.

The telescoping nature of plates 28 and 29 can best be appreciated by reference to FIGS. 1 and 3, where it is noted that a plurality of slots (6 in the illustrated embodiment) are provided on upper plate 29, the slots 36 being arranged in three pairs of two slots each, the slots being colinear with one another, but vertically spaced. A hole 38 is provided in plate 28 for each of the six slots 36, the holes being adapted to pass fasteners 40, such as metal screws, which extend through the holes 38 and engage slots 36. It will be appreciated that the smaller plate 29 can be moved vertically with respect to the larger plate 28 to accommodate different heights for opening 20 within the frame elements. For example, but not by way of limitation, the slots 36 may be between two and six inches in length. The number of slots and the types of fasteners can be varied by those who have read this specification and appreciate this aspect of the invention.

Figure 3A:
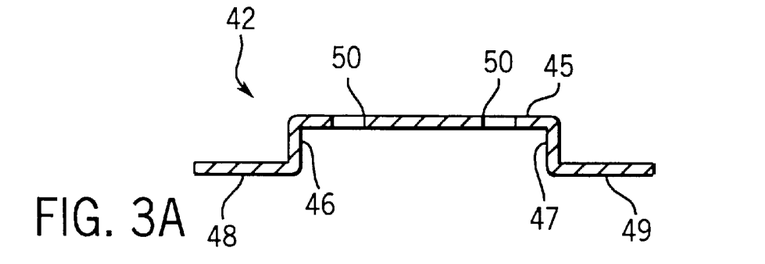
FIG. 3A is a cross-sectional view taken along the line 3A—3A of FIG. 3.

The next components of wire management system 10 to be described are the four elongate channels 42A, 42B, 42C and 42D extending vertically and horizontally spaced from one another on plate 28. In a preferred form, and as shown in FIG. 3A, each of channels 42A–42D are "hat-shaped" in cross-section and have a planar upper surface 45, sides 46 and 47 extending generally perpendicular to the upper surface, and a pair of outwardly extending flanges 48 and 49. Channels 42A–42D are preferably welded to plate 28.

From FIG. 1, two additional prominent features of channels 42A–42D can be noticed. First, each includes a pair of rows of vertical slots arranged near the outer edges of the front face 45 and extending generally the length of the channels 42A–42D. The number of slots and the length thereof can be varied considerably, but it will be appreciated that they must be of a geometry to accept the mounting blocks hooks and strain relief bracket hooks to be described later. In addition to the slots 50, a plurality of holes 52 are provided in the channel, which holes may be used for a variety of purposes including the attachment of channels 42A–42D to plate 28 or the attachment of wiring accessories, such as strain brackets and the like.

Figure 4:
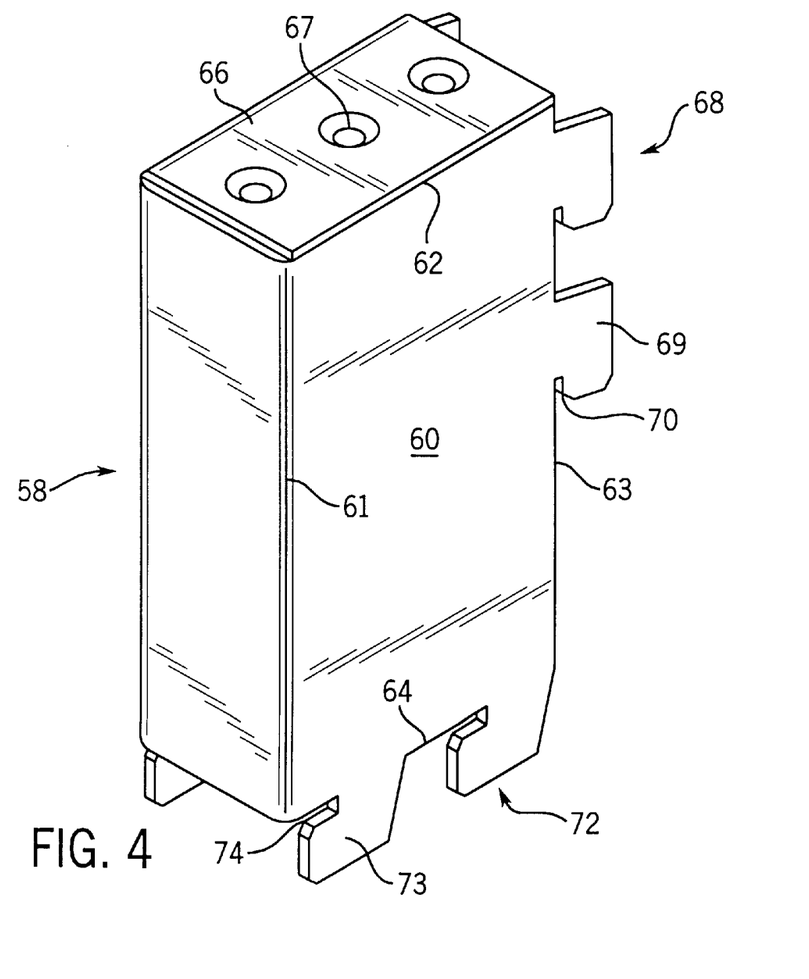
FIG. 4 is an enlarged perspective view of a preferred modular mounting block used in the embodiment shown in FIGS. 1–3.

The mounting blocks useful with the wire management system 10 are shown at reference numeral 58 and are shown in detail in FIG. 4. Each of the mounting blocks 58 is preferably a hollow block, rectangular in vertical, longitudinal and transverse cross-section and including a pair of larger side faces 60 defined by opposite longer edges 61 and 63 and shorter edges 62 and 64. One end of the hollow block 58 is covered by a generally rectangular end plate 66 which, in the illustrated embodiment, includes a plurality of fastener receiver openings 67 (three being shown in FIG. 4). A pair of the hooks 68 extend from edges 63 and are each defined by a rectangular tab 69 and a recesses 70 which extends upwardly toward the mounting plate 66, as drawn in FIG. 4. Four such hooks 68 are thereby provided on block 58, including two on face 60 which is shown in FIG. 4 and two on the opposite face 60 not visible in this drawing.

A second pair of hooks 72 extend from each of the shorter edges 64 of side faces 60, thereby providing four hooks 72, only two of which are visible in this drawing. Hooks 72 are each formed by a generally rectangular tab 73 and a recess 74 extending toward the right, as shown in FIG. 4, i.e. toward edge 63. The hooks are arranged and constructed so that block 58 may be attached to channels 42A–42D. If the hooks 68 are so attached to channels 42A–42D, the blocks 58 will be in the position shown in FIG. 4, i.e., with the mounting plate extending upwardly. It will also be appreciated by reference to FIG. 4 that if hooks 72 are instead inserted in slots 50, the mounting plate would face to the left. These two orientations for the mounting block are shown respectively in FIGS. 1 and 2. In FIG. 1, the hooks 72 are inserted into the slots 50 of channels 42A–42D. On the other hand, in FIG. 2, hooks 68 are inserted into the slots 50.

FIGS. 1 and 2 also show the attachment of brackets 76 and 78 to pairs of mounting blocks 58. Bracket 76 is a longer bracket and extends between mounting blocks 58 coupled to channel 42A and to channel 42D. Bracket 78, on the other hand, is a shorter bracket and is coupled to mounting blocks 58 on channels 42A and channel 42B. The brackets 76 and 78 are secured to the mounting blocks 58 using fasteners 79, such as screws. As mentioned in the introduction to this section of the specification, the brackets 76 and 78 can be selected from a variety of wiring component brackets, but in the illustrated embodiment, the brackets are of the type used to support patch panels for the connection and consolidation of data and voice wiring of the type used in modular office furniture.

Now that these FIGURES have been described in detail, several significant advantages of the invention are apparent. First, the orientation of the mounting blocks shown in FIG. 1 indicate that the long dimension of the blocks 58 project outwardly from the front 45 of the channels 42A–42D, so that the brackets 76 and 78 are presented outwardly for use by the installer or repair person. In this orientation, the combined depth of the brackets, channels and mounting blocks is greater than in the use orientation (shown in FIG. 2). In fact, the door 22 would not close fully with the mounting blocks 58 in the orientation shown in FIG. 1.

On the other hand, in FIG. 2, the brackets 76 and 78 face upwardly, i.e. in their use position, and the overall depth of the components of the wire management system 10 is less, thereby permitting the door 22 to be swung down and locked.

While mentioned above, several brief points are worth repeating with respect to modifications. Additional telescoping panels could be added if it is desired, for security or other reasons, to fully enclose the space 20. Side telescoping panels could extend outwardly from plate 28 toward or even past the vertical frame elements 17 and 19. In addition, the slots 50 could be provided directly in the plates 28 and 29, if there were no concern for rear security or potential damage from the hooks 68 and 72.

One final comment about this embodiment is warranted. There are no holes in the frame elements 13, 15, 17 and 19 for the passage of wire. Vertical frame elements 17 and 19 are arranged so that a space exists in front of them and in back of them with respect to planes passing through the most forward and most rearward surfaces of horizontal frame elements 13 and 15. Accordingly, wiring can be laid against the front or rear faces of frame elements 17 and 19. In addition, and as is apparent from FIG. 3, because of the inset of frame elements 17 and 19 from the ends of the lower horizontal frame element 13, wiring may extend downwardly between the end portions of lower horizontal frame element 13.

Figure 5:
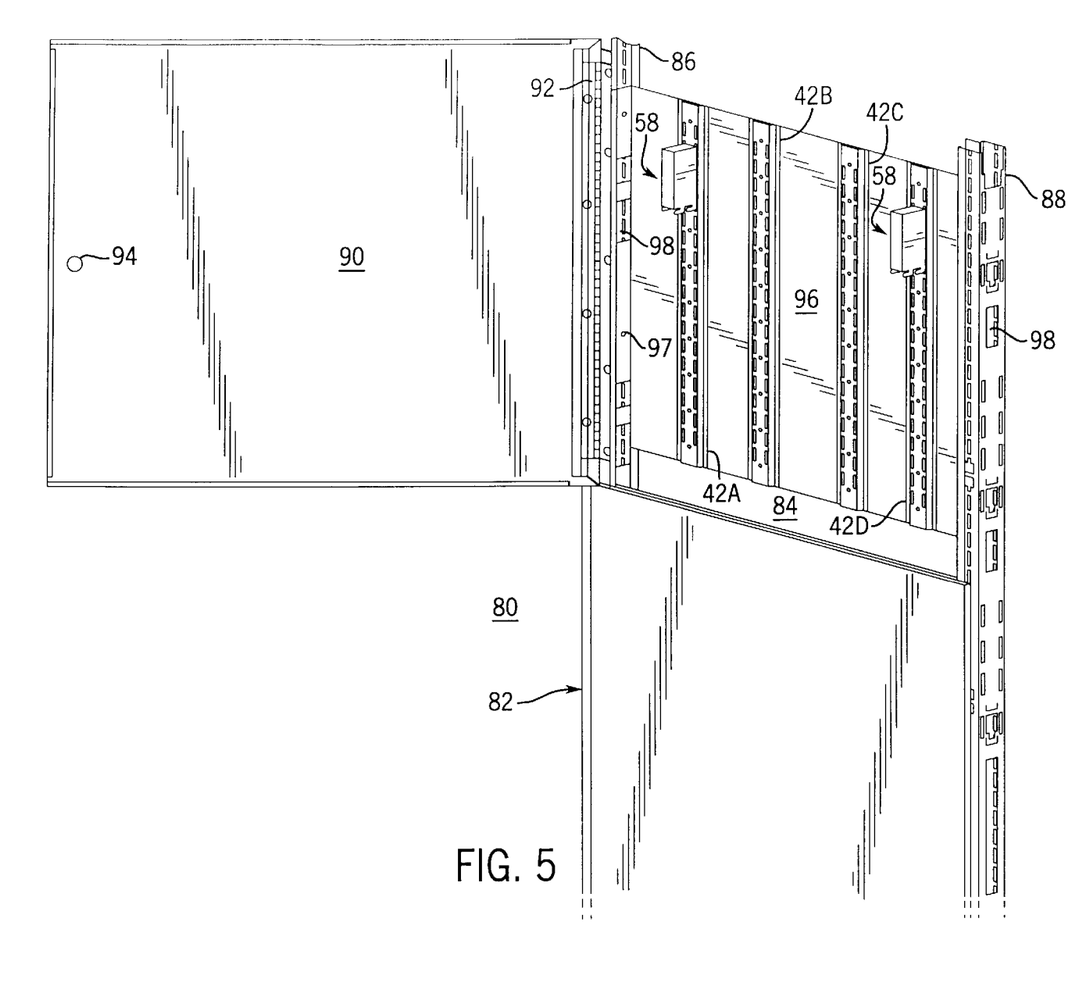
FIG. 5 is a perspective view of a first alternative embodiment of the present invention, in which a side hinged cover is employed.

A first alternative embodiment of the present invention is illustrated in FIG. 5, the main difference being the configuration of the support plate and the configuration of the furniture panel frame members. Wire management system 80 of this FIGURE is used in conjunction with a furniture panel 82 including a horizontal frame element 84, left vertical frame element 86 and right vertical element 88. A door 90 is provided for the compartment, door 90 being coupled by piano hinge 92 to the front face of vertical frame element 86. An opening 94 is provided for a lock. Instead of the telescoping plate previously described, support plate 96 in this embodiment is sized for the opening between the frame elements and is coupled to the vertical frame elements through holes 97 using any of the fasteners previously described. In addition, openings 98 are provided in the vertical frame elements for passing wires therethrough. Channels 42A–42D are identical to those previously described, as are the mounting blocks 58. Further details, including the brackets for patch panels and the like, are not shown in this drawing for ease of description.

Figure 6:
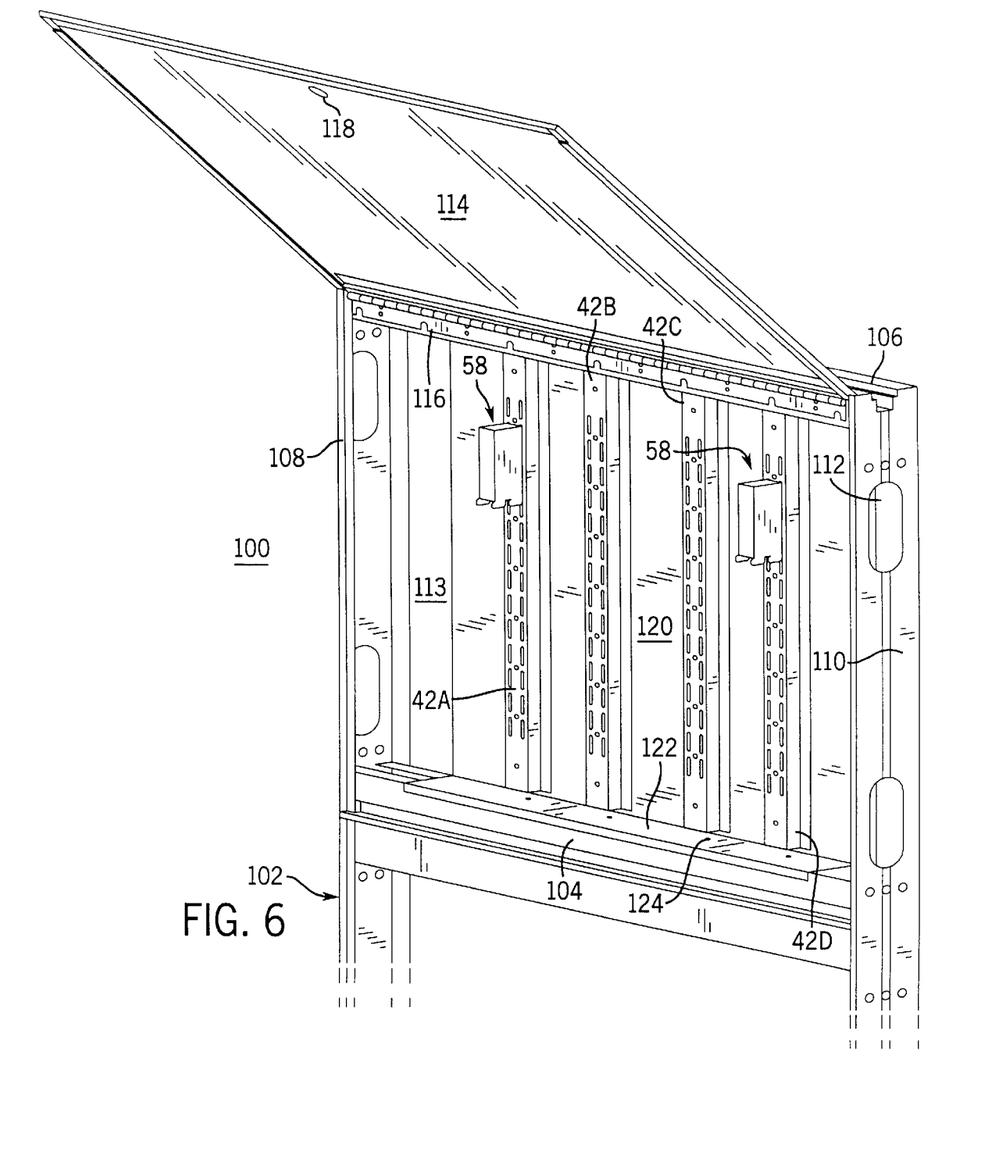
FIG. 6 is a perspective view of a second alternative embodiment of the present invention in which a top hinged cover is employed and in which the support plate for the mounting block support channels is a unitary plate.

Another wire management system 100 is shown in FIG. 6 and is adapted for use with a panel system 102 from which all skins and coverings have been removed. This panel 102 includes an intermediate horizontal frame element 104, an upper horizontal frame element 106 and vertical frame elements 108 and 110 on the left and right sides respectively. Holes 112 are provided in each of the vertical frame elements 108 and 110 for admitting wires into the opening defined by the frame elements and directing wires to other consolidation points, to workstations or the like. A space 113 is defined by the frame elements 104, 106, 108 and 110. The opening 113 is covered by door 114 coupled to upper frame element 106 by hinge 116. An opening 118 is provided for a lock.

This particular panel arrangement employs vertical frame elements which are at the ends of the horizontal frame elements, and in that respect differs from the embodiment of FIGS. 1–3. It also differs from the first described embodiment in that a unitary support plate 120 extends from the upper horizontal frame element 106 to the intermediate horizontal frame element 104 and includes a lower flange 122 having fastening openings 124 therein for coupling support plate 120 to the upper surface of horizontal frame element 104. A similar flange would be provided at the upper end of support plate 120 but would not be visible in this particular view. Channels 42A–42D and the support blocks are attached to support plate 120 in the manner previously described for other embodiments, and the mounting blocks 58 can be rotated as indicated above.

FIG. 7 illustrates several further aspects of the present invention in connection with the panel structure 102 and wire management components shown in FIG. 6. First, a lock 136 having a tongue 132 is provided in opening 118. Tongue 132 is adapted to be inserted into a slot 133 of bracket 134 mounted on lower flange 122 and generally near the center thereof. Bracket 134 is attached using fasteners 135.

FIG. 7 also shows a pair of prop rod systems 125 for retaining door 114 in an open position to allow access to the space 113 defined by the aforementioned horizontal and vertical frame elements. The prop rod systems 125 include a support plate 128 mounted on the inward faces of vertical frame elements 108 and 110 and an elongate plate 126 rotatably coupled thereto at an intermediate location 127. The free end 129 of the plate 126 has a fork shape adapted to be inserted into a bracket 130 attached to the inside surface of door 114. When not in use, the prop rod plate 126 simply rotates down to lie in a vertical storage position against the inner surface of plate 128. Bracket 130 resembles the lock bracket 134. Plate 128 also includes cut-outs 131, where they confront openings 112, to allow wires to enter and leave the space 113.

The final components shown in FIG. 7 are a pair of strain brackets 140 which are especially well suited for use with the present invention. Strain brackets 140 include a vertical plate 142 having two pairs of hooks 144 extending rearwardly from the right and left ends thereof, the hooks being arranged to be inserted into and dropped down into the slots 50. A flange 146 extends forwardly from the bottom of plate 142 and includes a plurality of slot shaped openings 148 therein, although circular or other shaped openings may be employed. Nine openings 148 are shown. The strain brackets 140 are used in a manner which will be readily appreciated by those skilled in the art. The bracket flanges 146 support the weight of wires used in the wire management systems of this invention and ties, such as plastic straps, are inserted through any of the openings 148 and around a wire bundle to assist in reducing the strain on the wire terminations as they are installed, repaired or rearranged. The adjustability as to the positions and orientations of the strain brackets in connection with the placement of mounting blocks 58 provides nearly unlimited flexibility for the users of the wire management systems. In addition, flanges 146 are preferably sufficiently malleable that various bends can be formed therein to cradle and better support the wiring.

While the present invention has been described in connection with three frame configurations and while several alternatives to the preferred embodiment have been illustrated in the foregoing FIGURES, the invention is not to be limited by the illustrations or the combinations of features shown therein but is to be limited solely by the scope of the claims which follow.

What is claimed is:

1. A wire management system for an office furniture panel comprising:

a panel frame defining an opening;

a support plate mounted within the opening;

a plurality of rows of slots on the support plate; and at least two mounting blocks, each mounting block having a pair of adjacent sides, each of the pair of sides having at least one hook extending therefrom, each hook configured to engage one slot, the mounting blocks being oriented in a first position when one of the pair of sides is coupled to the support plate using the at least one hook extending therefrom, the mounting blocks being oriented in a second position when the other of the pair of sides is coupled to the support plate using the at least one hook extending therefrom.

2. The wire management system of claim 1 wherein the slots are arranged in pairs of spaced-apart vertical rows, and wherein each mounting block side having hooks extending therefrom has four hooks extending therefrom, the four hooks being arranged in spaced-apart pairs for coupling with four slots.

3. The wire management system of claim 1 wherein each mounting block includes two generally rectangular and spaced-apart face walls having opposed longer and shorter edges and at least two generally rectangular walls coupling the face walls, the hooks being extensions from adjacent edges of the face walls.

4. The wire management system of claim 1 wherein each mounting block includes a receiving area for the attachment of a wire connection device.

5. The wire management system of claim 3 wherein a receiving area is provided on a wall of each mounting block which couples the shorter edges of the face walls from which hooks do not extend.

6. The wire management system of claim 4 wherein the receiving area includes openings for receiving fasteners.

7. The wire management system of claim 5 wherein the receiving area includes openings for receiving fasteners.

8. The wire management system of claim 1 including a wire connection device attached to a pair of mounting blocks.

9. The wire management system of claim 4 including a wire connection device attached to the receiving area of a pair of mounting blocks.

10. The wire management system of claim 5 wherein a wire connection device is attached to the receiving area of a pair of mounting blocks.

11. The wire management system of claim 1 wherein the slots are provided in the support plate.

12. The wire management system of claim 1 wherein the slots are provided in spaced apart hollow channels attached to the support plate.

13. The wire management system of claim 12 wherein each channel has a face which is parallel to the support plate and wherein the slots are provided in the face.

14. The wire management system of claim 13 wherein two rows of slots are provided in the face of each channel.

15. The wire management system of claim 1 wherein the support plate includes at least one flange extending perpendicularly from an edge thereof and arranged for attaching the support plate to a panel frame member.

16. The wire management system of claim 1 wherein the wire management system further includes at least one telescoping plate arranged for sliding movement with respect to the support plate to permit attachment of the wire management system to openings of different sizes.

17. The wire management system of claim 16 wherein the telescoping plate component is confined to move between first and a second limit positions and the wire management system further includes fasteners for securely joining the support plate and telescoping plate in a selected positional relationship.

18. The wire management system of claim 17 wherein the support plate includes at least one size adjustment slot, the telescoping plate includes an opening which moves along the size adjustment slot as the telescoping plate moves between its limit positions and a fastener passes through the slot and into the opening to securely join the support plate and telescoping plate in a selected positional relationship.

19. The wire management system of claim 1 including a door hinged to the frame and pivotable between an open position and a closed position, and in which the door in the closed position is generally parallel to but spaced apart from the support plate.

20. The wire management system of claim 19 further comprising at least one prop rod having a first end rotatably attached adjacent a vertical frame member and a second end movable between a storage position and a prop position wherein the second end engages the door.

21. The wire management system of claim 1 further including at least one strain bracket joined to at least one slot.

22. The wire management system of claim 21 wherein the strain bracket includes a plate having hooks extending from one face thereof and arranged for engaging slots, and a flange extending from the opposite face of the plate and containing a plurality of openings.

23. A wire management system for an office furniture panel comprising:

panel frame elements defining an opening;

a support plate mounted within the opening;

a door mounted on the frame elements for movement between an open position and a closed position in which the door is parallel to but spaced apart from the support plate;

a plurality of mounting blocks having a first side and an adjacent second side and further including means for attaching either adjoining side to the support plate, whereby the mounting blocks may be arranged in a first position in which the first side is perpendicular to the support plate or a second position in which the first side is adjacent to and parallel to the support plate; and at least one wire connection device attached to a pair of the mounting blocks.

24. The wire management system of claim 23 wherein the wire connection device comprises a bracket for supporting at least one patch panel.

25. The wire management system of claim 23 wherein each mounting block is rectangular in longitudinal and transverse cross-sections and wherein the first side is longer than the second side, and wherein the wire connection device is attached to a third side of each mounting block opposed to the second side.

26. The wire management system of claim 23 further including strain brackets and means for attaching the strain brackets to the support plate.

27. A method of wire management in office furniture panels comprising the steps of providing a wire management system as claimed in claim 1;

performing a wire management function to the system while the mounting blocks are in their first position; and moving the mounting blocks to their second position.

28. The method of claim 27 wherein the wire management system further includes at least one telescoping plate arranged for sliding movement with respect to the support plate to permit attachment of the wire management system to openings of different sizes and the method includes the additional step of moving the telescoping plate relative to the support plate and attaching each plate to the frame.

29. The method of claim 27 wherein the wire management system includes a cover and the method includes the additional steps of removing the cover before the first function performing step and replacing the cover after the mounting block moving step.

30. The method of claim 29 wherein the wire management system further includes at least one prop rod and the method includes the further step of propping the door in the open position before the first function performing step.

31. The method of claim 27 wherein the wire management system further includes at least one strain bracket and the method includes the additional step of relieving strain on wiring within the management system.

32. A method for wire management in an office furniture panel having a frame defining an opening comprising the steps of installing a support plate within the opening to extend between at least two opposing sides thereof;

attaching a door to the frame to provide a compartment when the door is in a closed position in which it lies parallel to the support plate, and access for wire management functions when the door is in an opened position;

removably coupling a plurality of mounting blocks to the support plate, each mounting block having a first side which is perpendicular to the support plate and a second adjoining side which is parallel to and adjacent the support plate;

attaching wire connection devices to the mounting blocks;

removing the mounting blocks having wire connection devices attached thereto and rotating the mounting blocks so that the first sides of the mounting blocks are adjacent and parallel to the support plate;

removably coupling the mounting blocks and associated wire connection devices to the support plate while in the rotated position; and closing the door.

33. The method of claim 32 wherein the support plate includes slots and the mounting blocks include hooks and wherein the removably coupling steps comprise placing the hooks of the mounting blocks into slots.

34. The method of claim 32 wherein the support plate includes channels having slots and the removably coupling steps comprise inserting mounting block hooks into channel slots.

* * * * *